US012107357B2

(12) United States Patent
Schroll et al.

(10) Patent No.: US 12,107,357 B2
(45) Date of Patent: Oct. 1, 2024

(54) EDGE CONNECTOR

(71) Applicant: MD ELEKTRONIK GmbH, Waldkraiburg (DE)

(72) Inventors: Dominik Schroll, Ampfing (DE); Thomas Grasser, Gars am Inn (DE); Daniel Bock, Schoenberg (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 360 days.

(21) Appl. No.: 17/694,753

(22) Filed: Mar. 15, 2022

(65) Prior Publication Data

US 2022/0311163 A1 Sep. 29, 2022

(30) Foreign Application Priority Data

Mar. 29, 2021 (DE) .................... 10 2021 107 810.5

(51) Int. Cl.
*H01R 12/72* (2011.01)
*H01R 12/71* (2011.01)
*H01R 103/00* (2006.01)

(52) U.S. Cl.
CPC ......... *H01R 12/724* (2013.01); *H01R 12/716* (2013.01); *H01R 2103/00* (2013.01)

(58) Field of Classification Search
CPC . H01R 12/724; H01R 12/726; H01R 2103/00
USPC .......................................................... 439/408
See application file for complete search history.

(56) References Cited

U.S. PATENT DOCUMENTS 6,183,302 B1 * 2/2001 Daikuhara ............. H01R 24/44 439/607.1
6,764,338 B2 * 7/2004 Fang .................... H01R 12/721 439/607.2
7,025,633 B2 * 4/2006 Kumamoto ........ H01R 13/6585 439/607.05
(Continued)

FOREIGN PATENT DOCUMENTS

CN 110233373 A * 9/2019 ........... H01R 12/724
EP 2184810 A1 * 5/2010 ......... H01R 13/6461
(Continued)

*Primary Examiner* — Peter G Leigh
(74) *Attorney, Agent, or Firm* — LEYDIG, VOIT & MAYER, LTD.

(57) ABSTRACT

An edge connector for connecting to a mating connector includes an outer conductor having a main body and plug-in portion, and first and second inner-conductor contacts arranged at least partly inside the outer conductor. The inner-conductor contacts each comprise a coupling end and a contact end. A shortest spacing between the coupling end and the contact end of the first inner-conductor contact is different from a shortest spacing between the coupling end and the second contact of the second inner-conductor contact. The overall electrical lengths of the inner-conductor contacts are the same. The contact ends are arranged in parallel on a main plane and in the plug-in portion. The inner-conductor contacts are arranged at least partly inside a receiving chamber of the main body. The main plane divides the receiving chamber into first and second asymmetric chamber portions. An insulator galvanically isolates the inner-conductor contacts from the outer conductor.

11 Claims, 3 Drawing Sheets

(56) References Cited

U.S. PATENT DOCUMENTS

| | | | | |
|---|---|---|---|---|
| 7,717,745 | B2 * | 5/2010 | He | H01R 13/642 439/607.23 |
| 7,878,847 | B2 * | 2/2011 | He | H01R 24/60 439/541.5 |
| 8,033,841 | B2 * | 10/2011 | He | H01R 13/6473 439/108 |
| 8,083,530 | B2 * | 12/2011 | Kobayashi | H01R 13/6594 439/607.04 |
| 8,109,790 | B2 * | 2/2012 | He | H01R 12/707 439/607.35 |
| 8,388,372 | B2 * | 3/2013 | He | H01R 27/02 439/541.5 |
| 8,475,217 | B2 * | 7/2013 | Zhu | H01R 12/724 439/701 |
| 2004/0242072 | A1 | 12/2004 | Kumamoto et al. | |
| 2008/0132096 | A1 * | 6/2008 | Yamagami | H01R 4/024 439/79 |
| 2011/0151722 | A1 * | 6/2011 | Kobayashi | H01R 13/6594 439/660 |
| 2011/0159746 | A1 * | 6/2011 | He | H01R 13/6473 439/660 |
| 2012/0040562 | A1 * | 2/2012 | Zhu | H01R 13/506 439/626 |

FOREIGN PATENT DOCUMENTS

| | | | | |
|---|---|---|---|---|
| JP | 2000012130 | A * | 1/2000 | |
| JP | 2000068006 | A * | 3/2000 | H01R 24/44 |
| JP | 2009048919 | A * | 3/2009 | H01R 13/6461 |
| JP | 5038818 | B2 * | 10/2012 | H01R 13/6461 |
| JP | 2019153493 | A * | 9/2019 | H01R 12/724 |

* cited by examiner

EDGE CONNECTOR

CROSS REFERENCE TO RELATED APPLICATION

Priority is claimed to German Patent Application No. DE 10 2021 107 810.5, filed on Mar. 29, 2021, the entire disclosure of which is hereby incorporated by reference herein.

FIELD

The invention relates to an edge connector for connecting a mating connector to a printed circuit board, in particular releasably.

The present invention is described predominantly in conjunction with cables and plugs for symmetrical data transmission. However, it goes without saying that the present invention can be used in all applications in which a plurality of conductors are intended to be contacted by means of a plug and a plug socket or jack.

BACKGROUND

In modern data processing applications, the volumes of data to be transmitted in a system are continually rising. In vehicles, for example, functions are implemented for driving the vehicle in a semi-autonomous or fully autonomous fashion, for which a plethora of sensor data and control data has to be transmitted.

To connect the individual components of a system of this type, e.g. the controllers, sensors, and actuators, a multiplicity of cables, plugs, and corresponding jacks or plug sockets are required. Due to the positive properties for data transmission, in particular the high immunity against external disturbances, symmetrical data transmission systems are often used in systems of this kind. Symmetrical data transmission systems of this kind use, for example, "twisted-pair cables," in which conductor pairs twisted together are used for data transmission.

To ensure the quality of the data transmission, in particular at high transmission frequencies, in these systems, the characteristic impedance of the push-pull mode should be constant over the cable length. In addition, both the self-inductance of the individual cables of a conductor pair and the capacitance in relation to the conductive housing should be the same for any given cable portion. The lengths of the data transmission paths for the individual cables of a conductor pair should also be as identical as possible. Moreover, the capacitances on the conductor path should be as constant as possible.

Therefore, at the connection points at which a twisted-pair cable of this type is connected to a device, e.g. to a vehicle controller, corresponding plug-in connector systems are used, in which the contacts are the same length and are guided in parallel with one another. For plug-in connector systems of this kind, it can thus be ensured that the conductor pairs are the same length and the capacitances are constant between the contacts.

Since the individual contacts are arranged next to one another in plug-in connector systems of this kind, a plug-in connector system of this kind requires a corresponding amount of installation space, in particular if the plug-in connector system is partly arranged on a printed circuit board. In addition, in the case of arrangement on a printed circuit board, the problem often arises whereby, to be able to use the printed circuit board as effectively as possible, the plug-in connector system is provided on the edge of the printed circuit board with a plugging direction parallel to the printed circuit board. However, this additionally hampers the parameters that are of crucial importance for the quality of the data transmission, such as keeping the impedance of the push-pull mode, and in particular the capacitance of the inner conductors in relation to the outer conductor, as constant as possible.

SUMMARY

In an embodiment, the present invention provides an edge connector for connecting to a mating connector. The edge connector includes an outer conductor, which comprises a main body and a plug-in portion, and a first and a second inner-conductor contact, which are arranged at least in part inside the outer conductor. The first inner-conductor contact comprises a first coupling end and a first contact end, and the second inner-conductor contact comprises a second coupling end and a second contact end. The first and second coupling ends are configured to electrically couple the first and second inner-conductor contacts, respectively, to a printed circuit board. The first and second contact ends are configured to electrically connect the first and second inner-conductor contacts, respectively, to an inner-conductor contact element of the mating connector. A shortest spacing between the first coupling end and the first contact end is different from a shortest spacing between the second coupling end and the second contact end. An overall electrical length of the first inner-conductor contact is identical to an overall electrical length of the second inner-conductor contact. The first and second contact ends are arranged in parallel with one another on a main plane and in the plug-in portion. The first and second inner-conductor contacts are arranged at least in part inside a receiving chamber of the main body. The main plane divides the receiving chamber into a first chamber portion and a second chamber portion. The first chamber portion is formed asymmetrically in relation to the second chamber portion. An insulator galvanically isolates the first and second inner-conductor contacts from the outer conductor.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
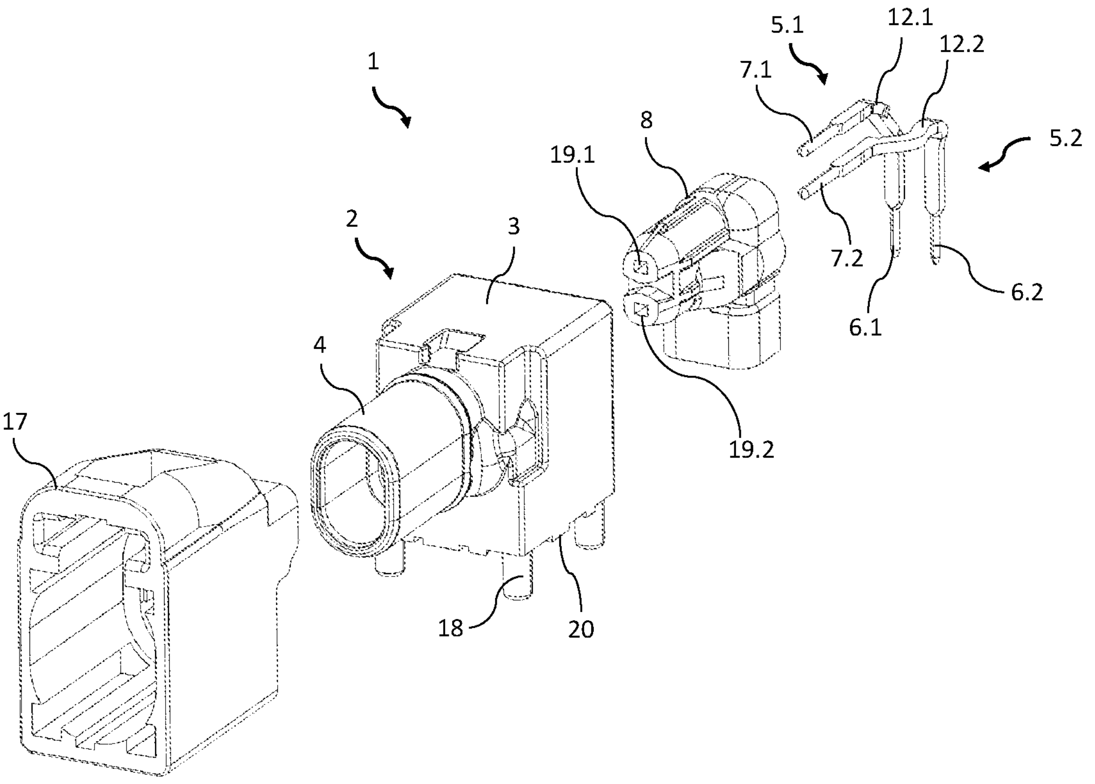
FIG. 1A is an exploded view of a first embodiment of an edge connector according to the invention.

Embodiments of the present invention reduce the installation space requirements for a plug on a printed circuit board while retaining the highest possible data transmission quality.

An edge connector according to an embodiment of the invention for connecting to a mating connector comprises an outer conductor. The outer conductor includes a main body and a plug-in portion. The outer conductor can be fastened to a printed circuit board by means of the main body. For this purpose, the main body can comprise appropriate fastening means. The plug-in portion can be provided for connecting to a mating connector. The connection to the mating connector is preferably made releasably. Preferably, the plug-in portion is connected to an outer conductor of the mating connector. In addition, the edge connector includes a first and a second inner-conductor contact. The first and second inner-conductor contacts are arranged at least in part inside the outer conductor. The first inner-conductor contact comprises a first coupling end and a first contact end. The second inner-conductor contact comprises a second coupling end and a second contact end. The first and second inner-conductor contacts are galvanically isolated from the outer conductor by an insulator. For this purpose, the first and second inner-conductor contacts can be arranged at least in part inside the insulator, the insulator preferably being arranged inside the outer conductor.

The first and second coupling ends are designed to electrically couple the relevant inner-conductor contact to the printed circuit board. The coupling ends can, for example, be pin-like, such that the coupling ends can be connected, in particular soldered, to the printed circuit board. Preferably, the first coupling end is arranged in parallel with the second coupling end, it being possible in particular for a longitudinal-extension direction of the first coupling end to be arranged in parallel with a longitudinal-extension direction of the second coupling end. Moreover, it is preferable for the coupling ends to project out of the receiving chamber of the main body on a bottom side facing the printed circuit board. Preferably, the outer conductor is also fastened to the printed circuit board on the bottom side. In addition, the bottom side can be arranged perpendicularly to a main-body side bordered by the plug-in portion. The first and second contact ends are designed to electrically connect the relevant inner-conductor contact to an inner-conductor contact element of the mating connector. Accordingly, the contact ends can be formed as pins or jacks. The shortest spacing between the first coupling end and the first contact end is different from the shortest spacing between the second coupling end and the second contact end. The coupling ends and the contact ends of the inner-conductor contacts can be extended in an elongate manner. Therefore, the spacing can be defined, for example, starting from the ends of the coupling ends and contact ends.

The overall electrical length of the first inner-conductor contact is identical to the overall electrical length of the second inner-conductor contact. In this regard, an identical overall electrical length can be construed as meaning that the difference between a signal propagation time of a signal sent via the first inner-conductor contact and a signal propagation time of a signal sent via the second inner-conductor contact is within a tolerance window. A tolerance value of this kind can, for example, be selected depending on the frequency of the signals to be transmitted, and thus depending on the wavelength of said signals, in such a way that error-free data transmission is ensured and limit values predetermined by the relevant transmission system are adhered to. The tolerance value can, for example, be 20%, 10%, or 5% of the average of the electrical lengths of the two inner-conductor contacts. In this regard, the signal propagation time can be construed as an interval between a first instant and a second instant. During the first instant, a pulse input at the contact end or coupling end takes on the average of its maximum value and minimum value whereas, during the second instant, a received pulse at the other end, i.e. at the coupling end or contact end, respectively, of the same inner-conductor contact, takes on the average of its maximum value and minimum value. In this case, the overall geometric length of the first inner-conductor contact need not necessarily be identical to the overall geometric length of the second inner-conductor contact. A geometric length difference between the first and second inner-conductor contacts is, however, preferably selected such that the difference in the signal propagation time for the transmission paths, each consisting of an inner-conductor contact and the outer conductor, is within a tolerance window.

The inner-conductor contacts can be elongate and have a shape that diverges from a straight shape. Consequently, the contacts can be bent or curved accordingly, at least in some portions. In one embodiment, the coupling ends and contact ends can in particular have a straight or approximately straight shape and can be elongate. The contacts can, for example, be formed as punched-bent parts or as curved wire pieces.

The first and second contact ends are arranged in parallel with one another. In particular, the longitudinal-extension directions of the first and second contact ends are arranged in parallel with one another. In addition, the first and second contact ends are both arranged on a main plane and inside the plug-in portion. The main plane preferably extends in parallel with the longitudinal-extension directions of the first and second contact ends. Moreover, it is preferable for the main plane to be arranged perpendicularly to the printed circuit board. It should be noted that the main plane is an imaginary plane for illustration purposes. The first and second inner-conductor contacts are arranged at least in part inside a receiving chamber of the main body. Preferably, the receiving chamber adjoins the plug-in portion, the receiving chamber preferably being accessible at least through one side of the main body and through the plug-in portion. The main plane divides the receiving chamber into a first chamber portion and a second chamber portion. In the process, the first chamber portion is formed asymmetrically in relation to the second chamber portion. The first chamber portion thus has a shape or external contour that differs from the shape or external contour of the second chamber portion. Consequently, the volume of the first chamber portion can also be different from the second chamber portion.

Embodiments of the present invention make it possible to configure the edge connector to be very narrow when the two contact ends are arranged vertically one above the other, i.e. perpendicularly to the printed circuit board. Consequently, more edge connectors can be arranged on the same width of printed circuit board than in the case of conventional plug sockets. At the same time, the fact that the contacts have the same overall electrical length ensures that the signals have the same propagation time on both conductor paths. By additionally adapting the receiving chamber of the outer conductor in the region of the main body, it can be ensured that the capacitance of the inner-conductor contacts in relation to the outer conductor remains as constant as possible, and thus that the quality of the data transmission remains constant.

In one embodiment, over the overall extension length of the inner-conductor contacts, the shortest spacing between the first inner-conductor contact and the second inner-conductor contact can vary at most by a predetermined limit value. The first inner-conductor contact and the second inner-conductor contact can have different geometries, as already explained above. In particular, the inner-conductor contacts can be twisted into one another such that the spacing between the inner-conductor contacts is approximately constant over their overall length. In the process, the spacing should in each case be seen as the shortest spacing between the two inner-conductor contacts at each point over their overall extension length. The limit value can, for example, be defined as an absolute value, e.g. as a value in millimeters. Alternatively, the limit value can also be defined as a relative value, e.g. as a percentage of the greatest or smallest spacing present. By way of example, the limit value can be 1 mm, 0.5 mm, or 0.25 mm. Alternatively, the limit value can be 20%, 10%, or 5%. As a result of the limit value, the two inner-conductor contacts extend with at least approximately the same spacing. Relatively small variations in the spacing can also be covered by the limit value.

Alternatively or additionally, the shortest spacing between the first and/or the second inner-conductor contact and the outer conductor over the overall extension length can also vary at most by a predetermined limit value. To be able to adhere to this limit value, the receiving chamber of the main body and/or the plug-in portion can be adapted to the geometry of the first and/or the second inner-conductor contact.

In a further embodiment, the longitudinal-extension direction of the first coupling end can be arranged at a first predetermined angle to the longitudinal-extension direction of the first contact end. Additionally or alternatively, the longitudinal-extension direction of the second coupling end can be arranged at a second predetermined angle to the longitudinal-extension direction of the second contact end. In particular, the first predetermined angle can be equal to the second predetermined angle. The first predetermined angle and the second predetermined angle can, for example, each be defined for a projection of the coupling ends and contact ends, respectively, into a predetermined plane. By way of example, this predetermined plane can be defined by the connecting line between the end of the first contact end and the end of the second contact end and the longitudinal axis or the longitudinal-extension direction of the first contact end or second contact end. The predetermined angles can, for example, be approximately 90°. In a configuration of this kind, the coupling ends can, for example, be guided vertically through a printed circuit board whereas the contact ends can be parallel to the plane of the printed circuit board. In addition, a connecting line between the first coupling end and the second coupling end can be arranged at a third predetermined angle to the main plane, in particular an angle from 60° to 120°, or from 70° to 110°, or from 80° to 100°, or from 85° to 95°, or an angle of 90°.

The first inner-conductor contact and/or the second inner-conductor contact can each comprise a length-compensation portion between the coupling end and the contact end. Preferably, the length-compensation portions are each arranged inside the receiving chamber at least in part. The length-compensation portions can be meander-shaped. A meander-shaped length-compensation portion should be construed as meaning that the length-compensation portion comprises at least one protuberance. In this case, the direction of entry into the length-compensation portion can be the same as the direction of exit out of the length-compensation portion. Alternatively, the length-compensation portion can also be integrated in one of the curves of the relevant inner-conductor contact. By means of the length-compensation portions, the geometric length of the first and second inner-conductor contacts can be adjusted in such a way that signal propagation time differences between the first and second inner-conductor contacts can be compensated for, such that the two inner-conductor contacts have an electrical length that is as identical as possible.

The length-compensation portions of the first and/or of the second inner-conductor contact can be arranged inside the insulator. In this case, the insulator can comprise contact ducts adapted to the contour of the inner-conductor contacts and in particular to the contour of the length-compensation portions. The contact ducts can each border an assembly duct, such that the inner-conductor contacts, and in particular the length-compensation portions, can be inserted into the contact ducts.

The first chamber portion can be defined by a first internal wall. In its main-extension direction, the first internal wall preferably extends in parallel with the main plane. The second chamber portion can be defined by a second internal wall opposite the first internal wall. The main plane is preferably arranged between the first internal wall and the second internal wall. The first internal wall preferably has a contour that is different from the contour of the second internal wall. This can be implemented, for example, by the first internal wall comprising elevations and/or depressions which the second internal wall does not comprise or at least comprises at a different location. Due to the resulting asymmetric contour of the first internal wall in relation to the second internal wall, the capacitance between the inner-conductor contacts and the outer conductor can be adapted such as to compensate at least partly for the effects that the arrangement and the shape of the two inner-conductor contacts have on the signal transmission quality. At this juncture, it is preferable for the first internal wall and the second internal wall to jointly form a contour that form-fittingly retains the insulator, arranged in the receiving chamber, in at least one dimension. In this case, the insulator is particularly preferably adapted to the contours of the first and second internal walls at least in some portions.

In the first chamber portion, the insulator can abut the first internal wall in some portions and can be spaced apart from the first internal wall in some portions. This produces at least one clearance, in particular in at least one portion in which the insulator is spaced apart from the first internal wall. This clearance can be filled with air, for example. If the insulator is spaced apart from the first internal wall in a plurality of portions, a plurality of clearances can also be formed. The shape of the clearances can be defined by the shape of the insulator and/or by the contour of the first internal wall. In particular, the clearances can be used to adapt the capacitance between at least one of the inner-conductor contacts and the outer conductor.

Alternatively or additionally, the first internal wall can comprise a bulge. The bulge can, for example, be provided for defining a spacing present in certain regions between the outer conductor and at least one inner-conductor contact. The bulge can also spread into walls that border the first internal wall.

The insulator can be arranged inside the bulge at least in part and fill the bulge at least in part. Where necessary, the insulator can be spaced apart from the first internal wall in the region of the bulge too, at least in some portions, such that a clearance is also formed in the region of the bulge.

In the second chamber portion, the insulator can abut the second internal wall in a manner following the contour thereof. In other words, the insulator can thus have an external contour, facing the second internal wall, that corresponds to a negative of the second internal wall in the region in which the insulator is arranged in a manner abutting the second internal wall during normal use.

The plug-in portion of the outer conductor can be formed in mirror symmetry in relation to the main plane. In particular, the plug-in portion can have an oval or round shape, a longitudinal-extension direction of the plug-in portion preferably extending in parallel with the main plane.

In addition, further advantages and features of embodiments of the present invention will be apparent from the following description of preferred embodiments. The features described therein and hereinabove may be implemented alone or in combination unless they contradict each other. The following description of the preferred embodiments is made with reference to the accompanying drawings.

Figure 1B:
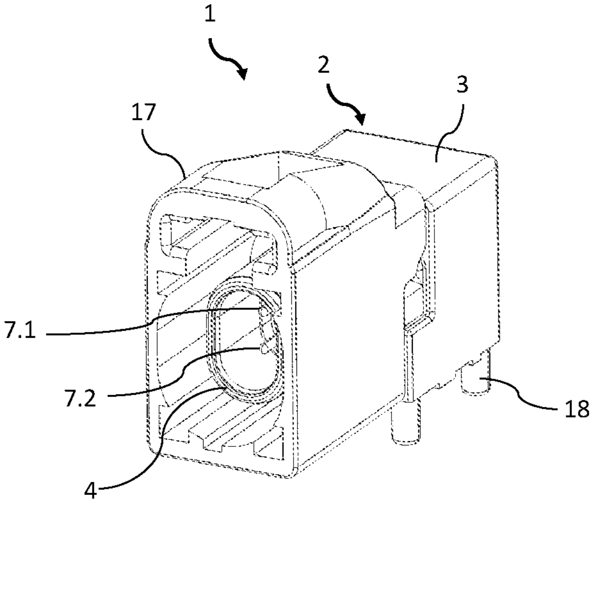
FIG. 1B is a three-dimensional view of the first embodiment of the edge connector according to the invention in the assembled state.

FIGS. 1A and 1B show a first embodiment of an edge connector 1 according to the invention, the edge connector 1 being shown in an exploded view in FIGS. 1A and 1*n* the assembled state in FIG. 1B. The edge connector 1 has an outer conductor 2. The outer conductor 2 is composed of a main body 3 and a plug-in portion 4. The main body 3 can be arranged on a printed circuit board at a bottom side 20. To be able to fasten the outer conductor 2 to the printed circuit board, the main body 3 has four fastening means, by means of which the outer conductor 2 can be non-releasably connected to the printed circuit board. The plug-in portion 4 extends perpendicularly away from the main body 3 from a side that is arranged perpendicularly to the bottom side 20. A housing 17 that surrounds the plug-in portion 4 can be fastened to the outer conductor 2. In the present embodiment, the housing 17 is fastened to the main body 3. In the present embodiment, the housing 17 has plug-in coding and a clip for receiving a snap-in closure.

The edge connector 1 also has an insulator 8 and a first and a second inner-conductor contact 5.1; 5.2. Both the first inner-conductor contact 5.1 and the second inner-conductor contact 5.2 each have a coupling end 6.1; 6.2, a contact end 7.1; 7.2, and a length-compensation portion 12.1; 12.2. In the first embodiment, a longitudinal-extension direction of the first coupling end 6.1 is arranged in parallel with a longitudinal-extension direction of the second coupling end 6.2. In addition, a longitudinal-extension direction of the first contact end 7.1 is arranged in parallel with a longitudinal-extension direction of the second contact end 7.2. Moreover, the longitudinal-extension direction of the first coupling end 6.1 is arranged perpendicularly to the longitudinal-extension direction of the first contact end 7.1. Consequently, the longitudinal-extension direction of the second coupling end 6.2 is also arranged perpendicularly to the longitudinal-extension direction of the second contact end 7.2. In the process, the shortest spacing between the first coupling end 6.1 and the first contact end 7.1 is different from the shortest spacing between the second coupling end 6.2 and the second contact end 7.2. However, the overall electrical length of the first inner-conductor contact 5.1 is identical to the overall electrical length of the second inner-conductor contact 5.2. What is produced as a result at the coupling ends 6.1; 6.2 is an arrangement that is rotated 90° with respect to the arrangement of the contact ends 7.1; 7.2.

The inner-conductor contacts 5.1; 5.2 are inserted in an insulator 8. For this purpose, the insulator 8 comprises contact ducts 19.1; 19.2 in which the inner-conductor contacts 5.1; 5.2 are positioned. Together with the insulator 8, the inner-conductor contacts 5.1; 5.2 are arranged inside the outer conductor 2. The insulator 8 galvanically isolates the inner-conductor contacts 5.1; 5.2 from one another and also from the outer conductor 2, such that there is no conductive connection between the inner-conductor contacts 5.1; 5.2 or from one of the inner-conductor contacts 5.1; 5.2 to the outer conductor 2. In the process, the contact ends 7.1; 7.2 are arranged in the plug-in portion 4 whereas the length-compensation portions 12.1; 12.2 are arranged in the main body 3. The coupling ends 6.1; 6.2 project out of the main body 3 on the bottom side 20 such that the inner-conductor contacts 5.1; 5.2 can be connected to the printed circuit board. Since, in the present embodiment, the contact ends 7.1; 7.2 are rotated 90° with respect to the coupling ends 6.1; 6.2, the contact ends 7.1; 7.2 are arranged vertically with respect to the printed circuit board to which the edge connector 1 is connected.

Figure 2:
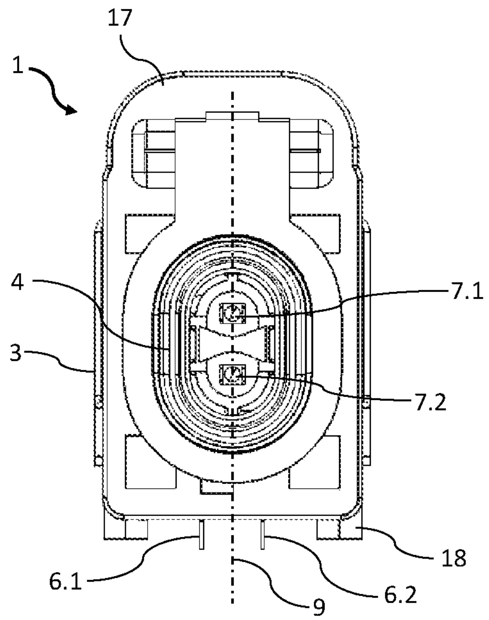
FIG. 2 is a further, front view of the first embodiment of the edge connector according to the invention.

FIG. 2 is a front view of the first embodiment of the edge connector 1 looking at the plug-in portion 4. In this case, the contact ends 7.1; 7.2 are facing the viewer. The contact ends 7.1; 7.2 are arranged in parallel with one another on an imaginary main plane 9. In the process, the main plane 9 extends in particular in parallel with the longitudinal-extension directions of the contact ends 7.1; 7.2. In the plug-in portion, the outer conductor 2 is arranged in mirror symmetry in relation to the main plane 9. In this case, the main plane 9 corresponds to a plane of symmetry. The main plane 9 extends between the coupling ends 6.1; 6.2. In the present embodiment, both coupling ends 6.1; 6.2 have the same spacing from the main plane 9. However, it is also possible for the spacings between the coupling ends 6.1; 6.2 and the main plane 9 to be different.

Figure 3:
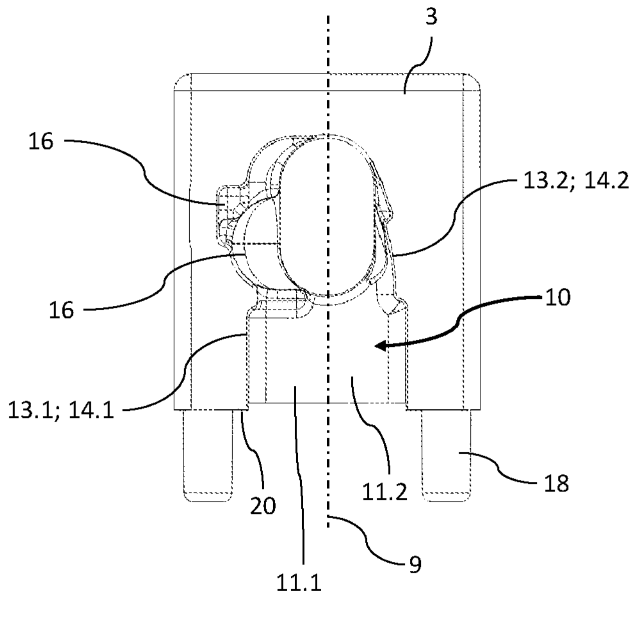
FIG. 3 is a view, from the rear, of a main body for an edge connector according to the invention in accordance with the first embodiment.

FIG. 3 is a view, from the rear, of the main body 3 for the edge connector 1 according to the first embodiment. In this case, the side of the main body 3 arranged opposite the side on which the plug-in portion is arranged is facing the viewer. The main body 3 has a receiving chamber 10, into which the inner-conductor contacts and the insulator can be inserted. The receiving chamber 10 is accessible through both the plug-in portion 4 and the bottom side 20. In addition, the receiving chamber extends as far as the main-body side arranged opposite the side on which the plug-in portion 4 is arranged, and is also accessible through said side. The main plane 9 divides the receiving chamber 10 into a first and a second chamber portion 11.1; 11.2. The first chamber portion 11.1 is delimited by a first internal wall 13.1, in addition to the main plane 9. The second chamber portion 11.2 is delimited by a second internal wall 13.2 opposite the first internal wall 13.1, in addition to the main plane 9. In this case, the main plane 9 is arranged between the two internal walls 13.1; 13.2. The first chamber portion 11.1 is formed asymmetrically in relation to the second chamber portion 11.2. In the present embodiment, for this purpose the first internal wall 13.1 has a contour 14.1 that is different from the contour 14.2 of the second internal wall 13.2. The first internal wall 13.1 also has two bulges 16.

Figure 4:
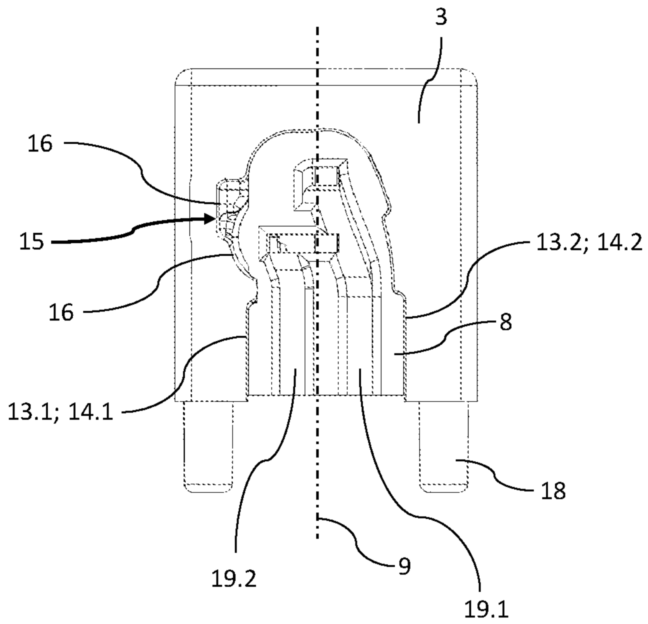
FIG. 4 shows the main body for the edge connector according to the invention in accordance with the first embodiment, having an inserted insulator.

FIG. 4 is a view, from the rear, of the main body 3 for the edge connector 1 according to the first embodiment, having an insulator 8 inserted into the receiving chamber 10. While, in the second chamber portion 11.2, the insulator 8 follows the contour 14.2 of the second internal wall 13.2, in the first chamber portion 11.1 the insulator 8 is spaced apart from the first internal wall 13.1 in the region of the bulges 16. In this case, the spacing between the insulator 8 and the first internal wall 13.1 varies at different points on the bulges 16. As a result of this spacing, a clearance 15 extending over the two bulges 16 is formed between the first internal wall 13.1 and the insulator. In the present embodiment, the clearance 15 is filled with air. By means of the bulges 16 and the clearance 15, the shape of the contour 14.1 of the first internal wall 13.1 is adapted in a targeted manner in order to purposively adjust the capacitance between the main body 3 and the second inner-conductor contact 5.2.

Figure 5:
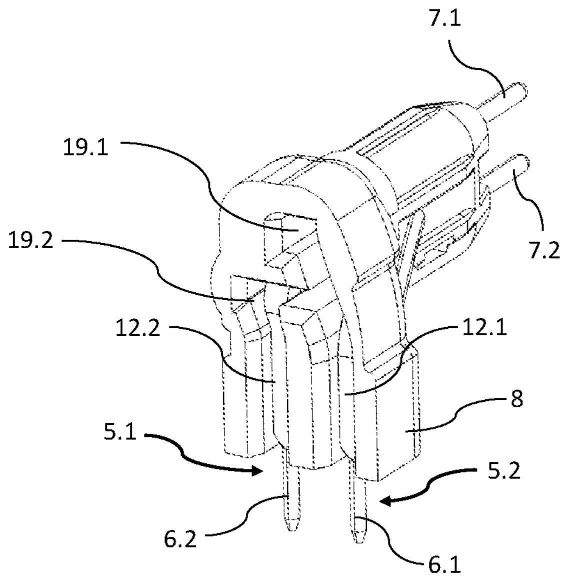
FIG. 5 shows an insulator for an edge connector according to the invention in accordance with the first embodiment.

FIG. 5 shows an insulator for an edge connector 1 according to the first embodiment. The first and second inner-conductor contacts 5.1; 5.2 are arranged inside the insulator 8 by their length-compensation portions 12.1; 12.2. However, both the coupling ends 6.1; 6.2 and the contact ends 7.1; 7.2 project out of the insulator 8 such that the coupling ends 6.1; 6.2 can be reliably connected to the printed circuit board and the contact ends 7.1; 7.2 can be connected to corresponding inner-conductor contact elements of a mating connector.

The explanations given with reference to the drawings are merely examples and should not be deemed limiting.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 edge connector
2 outer conductor
3 main body
4 plug-in portion
5 inner-conductor contact
6 coupling end
7 contact end
8 insulator
9 main plane
10 receiving chamber
11 chamber portion
12 length-compensation portion
13 internal wall
14 contour
15 clearance
16 bulge
17 housing
18 fastening means
19 contact duct
20 bottom side

What is claimed is:

1. An edge connector for connecting to a mating connector, the edge connector comprising:

an outer conductor, which comprises a main body and a plug-in portion;

a first and a second inner-conductor contact, which are arranged at least in part inside the outer conductor, the first inner-conductor contact comprising a first coupling end and a first contact end, and the second inner-conductor contact comprising a second coupling end and a second contact end, the first and second coupling ends being configured to electrically couple the first and second inner-conductor contacts, respectively, to a printed circuit board, the first and second contact ends being configured to electrically connect the first and second inner-conductor contacts, respectively, to an inner-conductor contact element of the mating connector, a shortest spacing between the first coupling end and the first contact end being different from a shortest spacing between the second coupling end and the second contact end, an overall electrical length of the first inner-conductor contact being identical to an overall electrical length of the second inner-conductor contact, the first and second contact ends being arranged in parallel with one another on a main plane and in the plug-in portion, the first and second inner-conductor contacts being arranged at least in part inside a receiving chamber of the main body, the main plane dividing the receiving chamber into a first chamber portion and a second chamber portion, and the first chamber portion being formed asymmetrically in relation to the second chamber portion; and an insulator, which galvanically isolates the first and second inner-conductor contacts from the outer conductor, wherein a longitudinal-extension direction of the first coupling end is arranged at a first predetermined angle relative to a longitudinal-extension direction of the first contact end and/or a longitudinal-extension direction of the second coupling end is arranged at a second predetermined angle relative to a longitudinal-extension direction of the second contact end.

2. The edge connector according to claim 1, wherein, over an overall extension length of the inner-conductor contacts, a shortest spacing between the first inner-conductor contact and the second inner-conductor contact varies at most by a predetermined limit value.

3. The edge connector according to claim 1, wherein the longitudinal-extension direction of the first coupling end is arranged at the first predetermined angle relative to a longitudinal-extension direction of the first contact end and the longitudinal-extension direction of the second coupling end is arranged at the second predetermined angle relative to a longitudinal-extension direction of the second contact end, and wherein the first predetermined angle is equal to the second predetermined angle.

4. The edge connector according to claim 1, wherein the first and/or the second inner-conductor contact comprise(s) a length-compensation portion between the respective coupling end and the respective contact end, and wherein the length-compensation portion(s) is arranged at least in part in the receiving chamber.

5. The edge connector according to claim 4, wherein the length-compensation portion(s) of the first and/or the second inner-conductor contact is arranged inside the insulator.

6. The edge connector according to claim 1, wherein the first chamber portion is defined by a first internal wall and the second chamber portion is defined by a second internal wall opposite the first internal wall, and wherein the first internal wall has a contour that is different from a contour of the second internal wall.

7. The edge connector according to claim 6, wherein, in the first chamber portion, the insulator abuts the first internal wall in some portions and is spaced apart from the first internal wall in some portions, such that at least one clearance is formed between the insulator and the first internal wall.

8. The edge connector according to claim 6, wherein the first internal wall comprises at least one bulge.

9. The edge connector according to claim 8, wherein the insulator fills the bulge at least in part.

10. The edge connector according to claim 6, wherein, in the second chamber portion, the insulator abuts the second internal wall in a manner following the contour of the second internal wall.

11. The edge connector according to claim 1, wherein the plug-in portion is formed in mirror symmetry in relation to the main plane.

* * * * *